United States Patent
Kant et al.

(10) Patent No.: US 9,210,615 B2
(45) Date of Patent: Dec. 8, 2015

(54) METHOD AND SYSTEM FOR ELASTIC AND RESILIENT 3G/4G MOBILE PACKET NETWORKING FOR SUBSCRIBER DATA FLOW USING VIRTUALIZED SWITCHING AND FORWARDING

(71) Applicants: Nishi Kant, Fremont, CA (US);
Heeseon Lim, Cupertino, CA (US);
Amit Chawre, Navi Mumbai (IN);
Sachin Kapur, Union City, CA (US)

(72) Inventors: Nishi Kant, Fremont, CA (US);
Heeseon Lim, Cupertino, CA (US);
Amit Chawre, Navi Mumbai (IN);
Sachin Kapur, Union City, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 83 days.

(21) Appl. No.: 14/029,784

(22) Filed: Sep. 17, 2013

(65) Prior Publication Data
US 2014/0078988 A1    Mar. 20, 2014

Related U.S. Application Data

(60) Provisional application No. 61/702,004, filed on Sep. 17, 2012.

(51) Int. Cl.
*H04W 28/10* (2009.01)
*H04L 12/24* (2006.01)

(52) U.S. Cl.
CPC .......... *H04W 28/10* (2013.01); *H04L 41/0813* (2013.01); *H04L 41/5054* (2013.01)

(58) Field of Classification Search
CPC ...................................................... H04L 45/38
See application file for complete search history.

(56) References Cited

U.S. PATENT DOCUMENTS

2013/0054761 A1*    2/2013    Kempf et al. ................. 709/220

OTHER PUBLICATIONS

"OpenFlow Switch Specification Version 1.1.0", Feb. 28, 2011.*

* cited by examiner

*Primary Examiner* — John Blanton
(74) *Attorney, Agent, or Firm* — Blank Rome, LLP

(57) ABSTRACT

A system and method in a packet network for optimally separating control and data in the context of mobile networking. The embodiments disclosed herein utilize virtualization and elastic computing in the context of a control plane while the user plane flexibility is realized by application programming interfaces (APIs) between a control and user plane. The control plane is configured to receive a notification that a mobile device is done sending or receiving a communication; store in a flow table flow information associated with the communication; receive a trigger for resumption of flow when the communication is to be resumed; and pass the flow information to a cache in a data plane.

19 Claims, 4 Drawing Sheets

METHOD AND SYSTEM FOR ELASTIC AND RESILIENT 3G/4G MOBILE PACKET NETWORKING FOR SUBSCRIBER DATA FLOW USING VIRTUALIZED SWITCHING AND FORWARDING

DRAWINGS

METHOD AND SYSTEM FOR ELASTIC AND RESILIENT 3G/4G MOBILE PACKET NETWORKING FOR SUBSCRIBER DATA FLOW USING VIRTUALIZED SWITCHING AND FORWARDING

FIELD OF THE INVENTION

The present disclosure relates generally to general packet radio service (GPRS) networks and their evolution including but not limited to Universal Mobile Telecommunication Systems (UMTS) and Long Term Evolution (LTE) systems. More particularly, this disclosure relates to a method and system for separating the control and data in the context of mobile networking. This disclosure also brings the notion of virtualization and elastic computing in the context of a control plane while the user plane flexibility is realized by application programming interfaces (APIs) between the control and user plane.

BACKGROUND

The GPRS, UMTS, and LTE systems are an evolution of the global system for mobile communications (GSM) standards to provide packet switched data services to GSM mobile stations. Packet-switched data services are used for transmitting chunks of data or for data transfers of an intermittent or bursty nature. Typical applications for Third Generation Partnership Project (3GPP) packet service include Internet browsing, wireless e-mail, video streaming, and credit card processing, etc. used by human users.

Wireless spectrum is a finite resource. As human civilization is becoming more mobile, the wireless mode of communication is taking a more prominent role for ever increasing types of applications and devices. Another major evolution in the nature of communications is that almost everything is communicated as data over an Internet Protocol (IP) network. The IP Protocol was originally designed for fixed wired networks. The IP Protocol does not handle mobility and as such needs assistance when the point of attachment for an IP endpoint changes. Thus voice, video or documents are all represented in form of IP packets. There are a multitude of applications for setup and management of these sessions. But unlike wired networks, the resources are allocated to communicating entities while they are active. Thus resources are allocated and taken away for a given IP flow several times during its lifetime.

Moreover, subscription characteristics, time and place of use, policies, encapsulation etc. form a valuable set of metadata that govern how such IP flows should be setup and managed in a mobile network. As a result the network nodes that have been designed to handle mobile data flows are inherently more complicated than their fixed network counterparts, routers and switches. For example nodes such as gateway GPRS support nodes (GGSN) and serving and packet data gateways (S/P-GW) in 3GPP networks, are built on router platforms or incorporate the routing functions but are much more complex and expensive.

Furthermore such nodes are rigidly dimensioned and it is very difficult to bring any flexibility in how the mobile gateways are connected to the external networks. FIG. 1 shows a traditional mobile network 100 where computing resources and call processing are statically tied to respective nodes. In other words, extra computing capacity at a Home Location Register (HLR) is of no use to an overloaded serving GPRS support node (SGSN).

Another important aspect of a mobile network is that the logical association between the user and the Internet goes through many nodes and as such the IP packet generated by a user application is encapsulated in different protocols between different nodes. As mentioned above such encapsulation is required to make the IP protocol work when the point of attachment for IP endpoints changes as user moves through the mobile network. In a third generation (3G) network the user plane is encapsulated in GPRS Tunneling Protocols (GTP) between radio network controller (RNC) and the SGSN and again in another GTP tunnel from SGSN to GGSN. The fourth generation (4G) network follows a similar mechanism between evolved node B (eNB) and serving gateway (S-GW) and between a serving gateway (S-GW) and a packet data network gateway (P-GW).

In fact, in recent years there has been significant progress in virtualization of computing and networking in fixed networks which allows for much higher efficiency in usage of computing resources and in terms of elastic allocation of resources (both in computing and bandwidth). Both open source and commercial hypervisors allow virtualization and flexible use of computing resources. Similarly, OpenFlow capable physical routers/switches and OpenVswitch allow flexible use of networking capabilities.

Unfortunately, neither OpenFlow nor OpenVswitch or any other such initiative for that matter, provide a mechanism to handle the metadata required for proper operation of mobile flows. This disclosure illustrates a system and method to specifically handle such data in the context of virtual and flexible networking.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
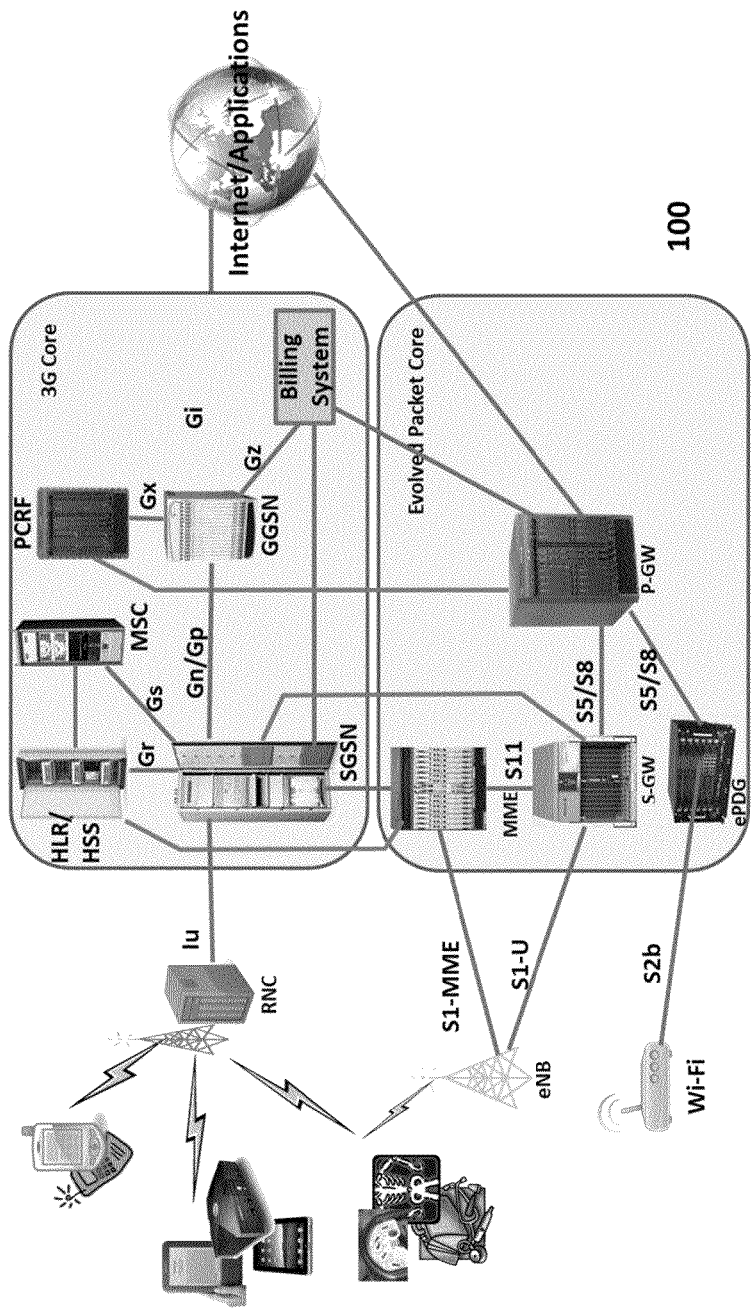
FIG. 1 is a block diagram illustrating complex interfaces with multiple nodes of a service provider that owns both 3G and 4G networks.

The embodiments disclosed herein extend the notion of separation of control and data in the context of mobile networking. As illustrated in the first embodiment of FIG. 2, network element 200 is located in a virtual cloud network which utilizes virtualization and elastic computing in the context of a control plane 202 while the user (or data) plane(s) 204 flexibility is realized by at least one or more API(s) 206 between the control plane 202 and user plane(s) 204. The control plane's job is to set up the flows for the mobile users. The user (or data) plane's job is to forward these flows to the correct networks. The user plane typically has been implemented on a router platform. Simple routers are pretty limited in flexibility. Most high end routers until recently were limited in flexibility by the operating system version they had and Command Line Interface commands that were enabled. For example, what could be done to a flow was limited by inflexible set of parameters and actions. Recently, the notion of software development kits (SDK) has become popular where independent software can be built and added to the routing platform. The SDK can be considered the most basic form of API which allows software add-ons for flow identification and flow treatment and policy based treatment. The extension of this API leads to SDN whereby the flow and routing constructs could be created at a node that has bigger network visibility (e.g., a SDN controller) and then be transferred to a routing/switching element that could be a hardware box of software implementation on a computing platform. OpenFlow is widely seen as the protocol between the SDN controller and the routing/switching element. The OpenvSwitch is a software implementation of switching/forwarding logic and is OpenFlow enabled. The key aspects of OpenFlow like API 206 are to identify flows (shallow, deep), packet treatment (drop/forward), encapsulation, decapsulation, etc.

Mobile characteristics of an IP flow from a mobile user such as subscriber information, location, policy, charging, activity status etc. are best handled in the control plane 202. Functions performed in the control plane 202 include attach/detach 202a; bearer management 202b; database 202c; mobile management 202d; policy processing 202e; and flow tracking 202f (discussed in detail below). Some signaling information in a mobile network is fast changing while some others change very infrequently. Similarly, some signaling has local significance while others could have global implications. The embodiments disclosed herein use tiered processing to allow signaling to be processed locally when it makes sense. For example, when the user equipment (UE) finishes transmitting or receiving data it goes in the idle mode and when user or application starts a new activity the UE becomes active. Depending on application and user activity, the UE can do idle/active transitions approximately every 2 seconds. This is fast occurring signaling. When the UE detects it has moved over a large geography it might need to do a tracking area update. Depending on size of the tracking area this would typically be slow occurring signaling.

If the control plane 202 can interact with the IP forwarding (or user or data) plane 204 using simple constructs (i.e., API(s) 206) regular switches or routers can be used for forwarding the mobile data. For example, OpenvSwitch may be used as a software implementation or OpenFlow capable hardware can be used for mobile data networking.

Figure 3:
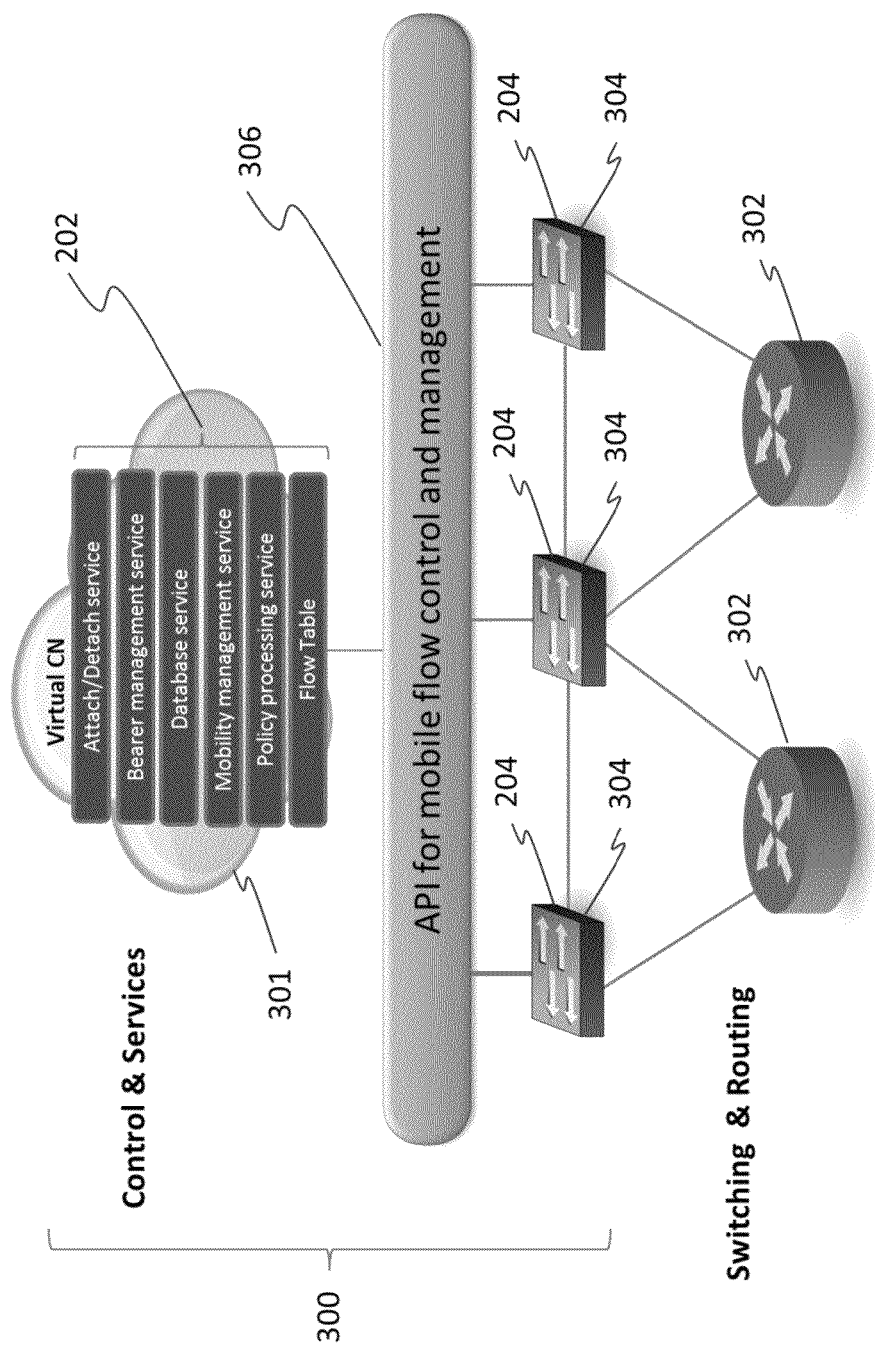
FIG. 3 is a block diagram of a second embodiment illustrating software defined networking (SDN) applied to a mobile network.

FIG. 3 shows a second embodiment with a system 300 realized with SDN. In this embodiment, the control plane 202 is located at a network element 301 and is connected to the data plane(s) 304a through API(s) 306. In this SDN implementation, a control plane 202 with a processing entity such as a control plane controller, running on one or more servers in a network, utilizes control logic to govern the behavior of network switching elements. The control plane controller communicates with the switches and routers (virtual layer-3 switches 302 and virtual hubs 304 (containing the data planes 304a)) that have been enhanced with a mobile extension to OpenvSwitch (including OpenFlow). (Note that while the network implementation is described herein with the help of OpenvSwitch, the concepts are equally applicable to physical switches). OpenvSwitch supports generic routing encapsulation (GRE) based tunneling as a logical port. This capability can be made generic so that any tunneling scheme can be used. The control plane needs to register the header for the new tunnel type and the decapsulation function of OpenvSwitch will simply extract the inner packet after the header.

In the context of mobile networking, all interactions from a user are encapsulated in a GPRS Tunneling Protocol (GTP) between radio access network and core network nodes such as SGSN or S-GW. The GTP tunneling is further used between SGSN and GGSN and S-GW and P-GW respectively. In 4G standards it is also possible to use Proxy Mobile IP (PMIP) for S-GW to P-GW tunneling. The external packet network that the user gets service from is identified by an Access Point Name (APN). Typically there is one GTP tunnel for a user for all communications from that user for this APN and for a given Quality of Service (QoS). Thus all packets within such a tunnel are forwarded to a border gateway (BG) for that APN. The BG is typically responsible for forwarding these packets towards their final destination. As soon as a user is done sending or receiving data in order to reuse the resources for other users, the radio link as well as the link between the RAN and core network is released. This is called idle mode. Once the user becomes active again the links are re-established. Thus the transition in and out of idle mode is done using control plane signaling.

Thus in the context of this disclosure with regard to the first and second embodiments, a control plane flow table (located in the flow table database 202f) needs to preserve the otherwise inactive flows and the control plane (i.e., the control plane controller) simply needs to send a trigger with tunnel (flow) identification to the OpenvSwitch to resume processing of the flow. However, if the time duration before resumption of traffic is too long (e.g., greater than five minutes) for whatever reason (out of coverage), the embodiments herein may allow for OpenvSwitch to remove flows that have remained idle for too long. In addition, the explicit control signaling for transition into idle mode will have the same effect of removing the flow from a user plane flow cache. In such a case, upon receiving a trigger for resumption of the flow, the OpenvSwitch would return error of flow not found. This will cause the control plane controller to pass complete flow information to the OpenvSwitch. This is done without causing any impact to any other part of the mobile network. The control plane controller can reinstate bulk flows as well. The term bulk flows as used herein refers to a set of flows. This capability allows for the ability to move processing of flows to another instance of OpenvSwitch upon failure which could, for example, be load balancing or route optimization reasons for bulk flow reinstatements.

The embodiments herein utilize a common flow table database 202f in the control plane 202 that the control plane controller sets up and modifies. The user (or data) plane entities 204 refer to this database 202f when faced with a new flow. After that, the user plane(s) 204 (or 304a) caches instructions for the flow in the user plane flow cache and continues to forward packets with cached instructions. This applies to each direction of flow. For packets arriving from the access network (i.e., IuPS/S1), the new flow is looked up with Tunnel Endpoint Identifier (TEID) as the key. TEID uniquely identifies a single user flow. For packets arriving from the network side (i.e., the Gi/SGi interface) the endpoint IP address and arrival port/gateway IP address is sufficient to identify a flow. This is because each user IP address is unique within the given packet data network as identified by APN. During the flow setup the control plane maps the gateway IP address or port identifier to the APN.

With the system and method described above there could be many user plane entities 204 (or 304a) that could be based on OpenvSwitch. These user plane entities 204 (or 304a) load share the forwarding responsibility for a number of flows. According to the embodiments described herein, such forwarding engines do not need to maintain any states. The caching in the user plane(s) is hierarchical. At the lowest levels multiple instances of OpenvSwitch on the same computing platform may share a common database and work on flows from this database. If a flow moves across a computing platform, the flow reinstatement mechanism will delete the flows that are moved out. So in the case of engine failure another engine needs to be started with the Tunnel IP address of the gateway (GTP transport address of GSN or S-GW) and the Gi/SGi gateway address of the gateway for the given APN. The embodiments disclosed herein greatly simplify the resumption of forwarding since the reinstated forwarding engine can then build the user plane flow cache as packets arrive.

OpenvSwitch is capable of minoring where packets could be mirrored at a port or on a GRE interface. This embodiment extends minoring to a lawful intercept (LI) interface for any given flow. A GTP encapsulated flow can be mirrored as well. The mirrored port can be connected to a LI agency. The lawful intercept setup can be done exactly the same way as any other flow except that it involves minoring of an existing flow.

Figure 2:
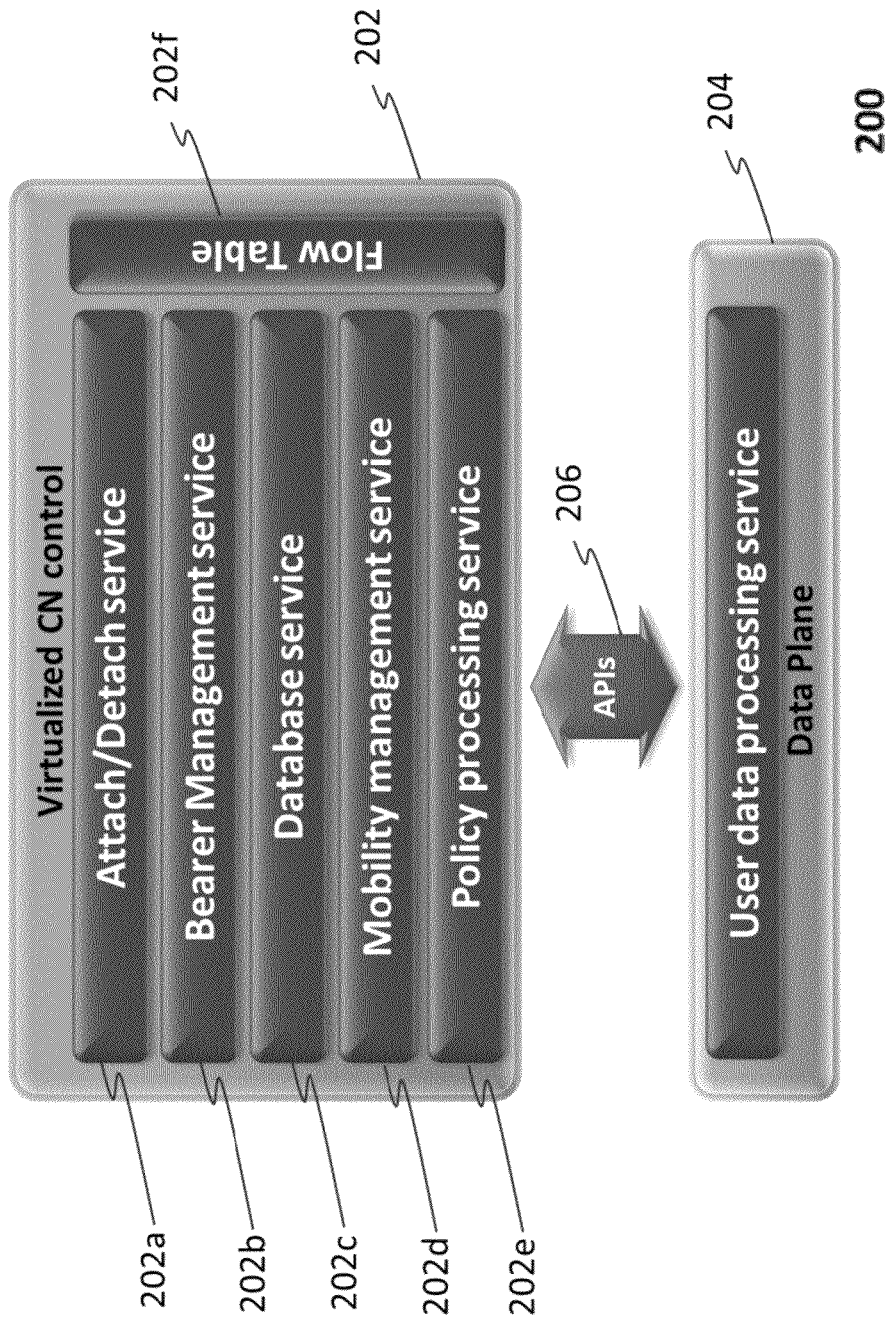
FIG. 2 is a block diagram of a first embodiment illustrating a system and method with separate mobile control and data processing according to one embodiment.
Figure 4:
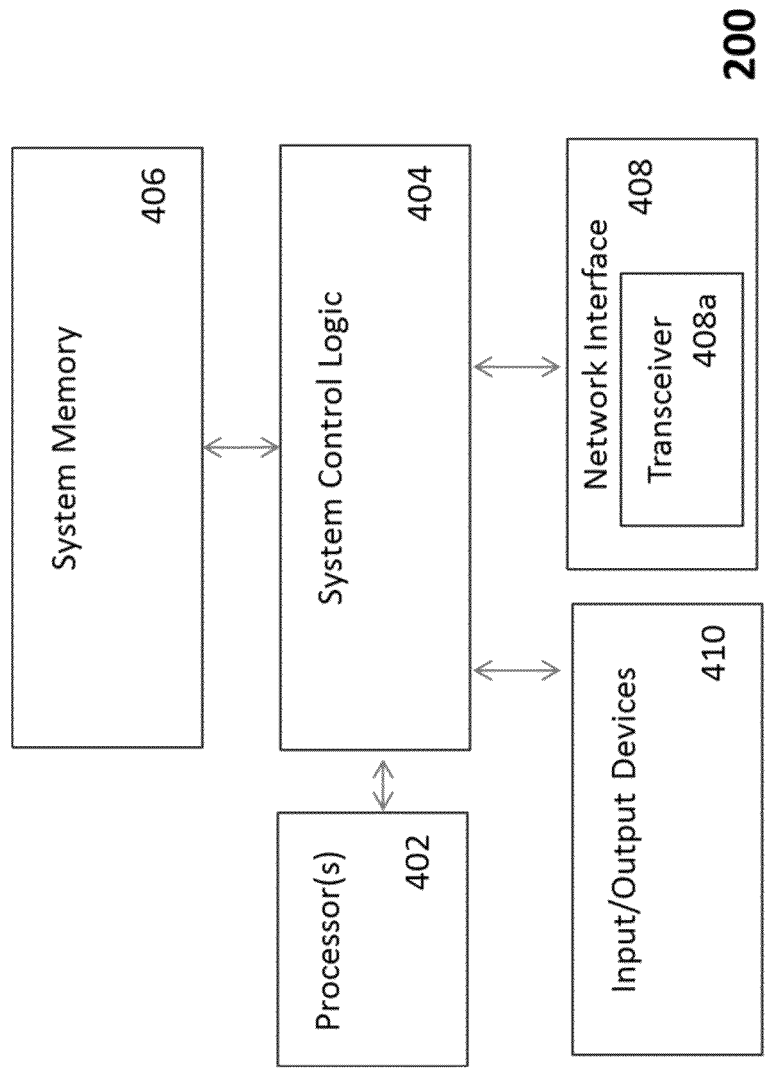
FIGS. 4 is a block diagram of an embodiment of the network element described herein.

In the first embodiment as shown in FIG. 2, the control plane 202, API(s) 206 and data plane(s) are all located at a network element 200. Alternatively, as described with regard to the second embodiment in FIG. 3, functions may be divided among a plurality of network elements as shown by the control plane 202 being located at network element 301 which is separated from the data planes 304a. The network elements 200, 301 and/or virtual hubs 304 may be structured as shown in FIG. 4. The control plane 202 and/or the user plane(s) 204 (or 304a) may each have a controller, logic, memory, interface, and input/output which may be implemented using any suitable hardware, software and/or firmware. FIG. 4 comprises one or more system control logic 404 coupled with at least one or all of the processor(s) 402, system memory 406, a network interface 408 (including a transceiver 408a), and input/output (I/O) devices 410. The processor(s) 402 may include one or more single-core or multi-core processors. The processor(s) 402 may include any combination of general-purpose processors and dedicated processors (e.g., graphics processors, application processors, baseband processors, etc.). System control logic 404 for one embodiment may include any suitable interface controllers to provide for any suitable interface to at least one of the processor(s) 402 and/or to any suitable device or component in a packet network in communication with system control logic 404. System control logic 404 for one embodiment may include one or more memory controller(s) to provide an interface to system memory 406. System memory 406 may be used to load and store data and/or instructions, for example, for network element 200. System memory 406 for one embodiment may include any suitable volatile memory, such as suitable dynamic random access memory (DRAM), for example. System memory 406 may also include non-volatile memory including one or more tangible, non-transitory computer-readable media used to store data and/or instructions, for example, such as the embodiments described herein. The non-volatile memory may include flash memory, for example, and/or may include any suitable non-volatile storage device(s), such as one or more hard disk drive(s) (HDD(s)), one or more compact disk (CD) drive(s), and/or one or more digital versatile disk (DVD) drive(s). The memory 406 may include a storage resource physically part of a device on which the network element or system 400 is installed or it may be accessible by, but not necessarily a part of, the device. For example, the memory 404 may be accessed over a network via the network interface 408 and/or over Input/Output (I/O) devices 410. Network interface 408 may have a transceiver 408a to provide a radio interface for system 400 to communicate over one or more network(s) and/or with any other suitable device. Network interface 408 may include any suitable hardware and/or firmware. The network interface 408 may include a plurality of antennas to provide a multiple input, multiple output radio interface. Network interface 408 for one embodiment may include, for example, a wired network adapter, a wireless network adapter, a telephone modem, and/or a wireless modem. For one embodiment, at least one of the processor(s) 402 may be packaged together with logic for one or more controller(s) of system control logic 404. For one embodiment, at least one of the processor(s) 402 may be integrated on the same die with logic for one or more controller(s) of system control logic 404. In various embodiments, the I/O devices 410 may include user interfaces designed to enable user interaction with the network element or system 400, peripheral component interfaces designed to enable peripheral component interaction with the network element or system 400, and/or sensors designed to determine environmental conditions and/or location information related to the network element or system 400. In various embodiments, the peripheral component interfaces may include, but are not limited to, a non-volatile memory port, a universal serial bus (USB) port, an audio jack, and a power supply interface.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) non-transitory quantities within the computer system's registers and memories into other data similarly represented as physical quantities within the computer system memories or registers or other such information storage, transmission or display devices.

Although process (or method) steps may be described or claimed in a particular sequential order, such processes may be configured to work in different orders. In other words, any sequence or order of steps that may be explicitly described or claimed does not necessarily indicate a requirement that the steps be performed in that order unless specifically indicated. Further, some steps may be performed simultaneously despite being described or implied as occurring non-simultaneously (e.g., because one step is described after the other step) unless specifically indicated. Moreover, the illustration of a process by its depiction in a drawing does not imply that the illustrated process is exclusive of other variations and modifications thereto, does not imply that the illustrated process or any of its steps are necessary to the embodiment(s), and does not imply that the illustrated process is preferred.

In this disclosure, devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for long period of time (e.g. weeks at a time). In addition, devices that are in communication with or coupled with each other may communicate directly or indirectly through one or more intermediaries.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

The invention claimed is:

1. A network element in a packet network system comprising:
   a network interface unit configured to interact with the packet data network system; and
   a control plane having a control plane controller with an associated memory and coupled to the network interface unit and adapted to:
      receive a notification that a mobile device has initiated a new flow for a data session communication;
      decide how the flows are managed in the packet data network;
      store in a flow table in the control plane controller new flow information associated with the communication;
      pass the new flow information to a cache in at least one of a plurality of network entities in a data plane;
      receive a notification that a mobile device is done sending or receiving a communication;
      receive a trigger for resumption of flow when the communication is to be resumed; and
      pass the flow information to the cache in the at least one of a plurality of network entities in the data plane when the period between the receiving of the notification that a mobile device is done sending or receiving a communication and receiving the trigger for resumption of flow when the communication is to be resumed exceeds a predetermined period.

2. The network element of claim 1, wherein the flow information includes tunnel identification which is at least one of GTP and PMIP.

3. The network element of claim 2, wherein the flow information includes metadata that governs how the flows should be setup and managed in the packet network system.

4. The network element of claim 3, wherein the metadata includes at least one of the following: subscription characteristics, time of use, place of use, processing policies, and encapsulation.

5. The network element of claim 2, wherein when a packet is received from an access network, a flow is looked up from a flow table with a Tunnel Endpoint Identifier.

6. The network element of claim 2, wherein the control plane includes at least one application programming interface (API) for coupling to the at least one of the plurality of network entities in the data planes.

7. A method of optimizing flow in a packet network comprising:
   receiving a notification that a mobile device has initiated a new flow for a data session communication;
   deciding how the flows are managed in the packet data network;
   storing in a flow table in a control plane controller new flow information associated with the communication;
   passing the new flow information to a cache in at least one of a plurality of network entities in a data plane;
   receiving a notification that a mobile device is done sending or receiving a communication;
   receiving a trigger for resumption of flow when the communication is to be resumed; and
   passing the flow information to the cache in the at least one of a plurality of network entities in the data planes when the period between the receiving of the notification that a mobile device is done sending or receiving a communication and receiving the trigger for resumption of flow when the communication is to be resumed exceeds a predetermined period.

8. The method of claim 7, wherein the flow information includes tunnel identification which is at least one of GTP and PMIP.

9. The method of claim 8, wherein the flow information includes metadata that governs how the flows should be setup and managed in the packet network system.

10. The method of claim 9, wherein the metadata includes at least one of the following: subscription characteristics, time of use, place of use, processing policies, and encapsulation.

11. The method of claim 8, wherein when a packet is received from an access network, a new flow is looked up from a flow table with a Tunnel Endpoint Identifier.

12. The method of claim 8, wherein when the at least one of a plurality of network entities in the data plane receives a notification that certain flows need to be migrated out of the flow table, the at least one of a plurality of network entities in the data plane deletes the flow information for that communication from the cache.

13. A system comprising:
   a network interface unit configured to interact with a packet network;
   a control plane having a control plane controller with an associated memory and coupled to the network interface unit and adapted to:
      receive a notification that a mobile device has initiated a new flow for a data session communication;
      decide how the flows are managed in the packet data network;
      store in a flow table in the control plane controller new flow information associated with the communication;
      pass the new flow information to a cache in at least one of a plurality of network entities in a data plane;
      receive a notification at the control plane that a mobile device is done sending or receiving a communication;
      receive a trigger at the control plane for resumption of flow when the communication is to be resumed; and
      pass the flow information to the cache in the at least one of a plurality of network entities in the data plane when the period between the receiving of the notification that a mobile device is done sending or receiving a communication and the trigger for resumption of flow when the communication is to be resumed exceeds a predetermined period; and
   a data plane having a data plane controller with an associated memory and coupled to the network interface unit and the control plane and adapted to:
      receive new flow information in at least one of a plurality of network entities in the data plane;
      place the received new flow information in a cache in the least one of a plurality of network entities in the data plane;
      forward the flow from the data plane to the packet network according to the flow information;
      determine that the flow has been idle for greater than the predetermined period;

remove the flow information from the cache if the flow has been determined to be idle for greater than the predetermined period:

receive an indication that the flow is to be resumed;

receive the flow information in the at least one of a plurality of network entities in the data plane after removing the flow information from the cache if the flow has been determined to be idle for greater than the predetermined period: and place the received flow information in the cache in the least one of a plurality of network entities in the data plane after removing the flow information from the cache if the flow has been determined to be idle for greater than the predetermined period.

14. The system of claim 13, wherein the flow information includes tunnel identification which is at least one of GTP and PMIP.

15. The system of claim 14, wherein the flow information includes metadata that governs how the flows should be setup and managed in the packet network system.

16. The system of claim 15, wherein the metadata includes at least one of the following: subscription characteristics, time of use, place of use, processing policies, and encapsulation.

17. The system of claim 14, wherein when a packet is received from an access network, a flow is looked up from a flow table with a Tunnel Endpoint Identifier.

18. The system of claim 14, wherein the data plane receives a notification that certain flows need to be migrated out of the cache, and the data plane deletes the flow information for that communication from the cache.

19. The system of claim 14, wherein the control plane is coupled to the at least one of the plurality of data planes through at least one application programming interface (API).

* * * * *